United States Patent Office 3,313,794
Patented Apr. 11, 1967

3,313,794
PROCESS FOR PRODUCTION OF
POLYETHYLENE
James W. Cleary, Bartlesville, Okla., assignor to Phillips
Petroleum Company, a corporation of Delaware
No Drawing. Filed Oct. 18, 1963, Ser. No. 317,147
8 Claims. (Cl. 260—94.9)

This invention relates to the polymerization of ethylene. In one aspect the invention relates to an improved method for polymerizing ethylene and to a novel catalyst therefor. In a further aspect the invention relates to an improved process for producing high density polyethylene without incurring a decrease in productivity.

Reactions for polymerizing ethylene are well known in the art and are generally carried out in the presence of catalysts. One class of catalysts which has been used or proposed for use in the polymerization of ethylene is admixtures of organometallic compounds with compounds of groups IV–B, V–B, and VI–B metals of the periodic system. It has also been proposed to conduct the polymerization reaction in the presence of hydrogen as a means of controlling the molecular weight of the polymer. In certain instances it is desirable to produce a polyethylene having a high density, for example on the order of 0.975. However, the utilization heretofore of hydrogen to increase the density of the polyethylene has resulted in a decrease in productivity. It would be advantageous to be able to increase the density of the polyethylene without incurring the decrease in productivity.

In accordance with the present invention it has been discovered that hydrogen can be employed to produce high density polyethylene without incurring a decrease in productivity by utilizing a catalyst system comprising a mixture of an alkylaluminum halide and a vanadium compound having the formula $VO(OR)_3$, where R is an alkyl or cycloalkyl radical containing from 1 to 20 carbon atoms. The alkylaluminum halide can be an alkylaluminum dihalide, or dialkylaluminum halide or mixtures thereof.

Accordingly it is an object of the invention to provide an improved process for polymerizing ethylene. Another object of the invention is to provide a process and catalyst system for producing high density polyethylene. A further object of the invention is to provide a novel catalyst system.

Other objects, aspects and the several advantages of the invention will be apparent to those skilled in the art from a study of the disclosure and the appended claims to the invention.

The organometal halides used in the catalyst system correspond to the formula $R_nAlX_{3-n}$, wherein R is a saturated acyclic hydrocarbon radical, a saturated cyclic hydrocarbon radical, an aromatic hydrocarbon radical, or mixtures of these radicals, each R containing from 1 to 10 carbon atoms, Al is aluminum, X is a halogen, and $n$ is an integer selected from the group consisting of 1 and 2. X can be any of the halogens, including chlorine, bromine, iodine and fluorine. Specific examples of organometal halides which are useful in the catalyst composition of this invention are $(CH_3)_2AlCl$, $(CH_3)AlCl_2$,

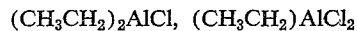
$(CH_3CH_2)_2AlCl$, $(CH_3CH_2)AlCl_2$

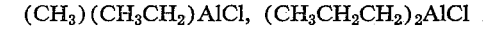
$(CH_3)(CH_3CH_2)AlCl$, $(CH_3CH_2CH_2)_2AlCl$

$(C_3H_7)AlCl_2$, $(C_4H_9)_2AlCl$, $(C_3H_7)(C_4H_9)AlCl$

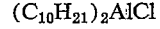
$(C_{10}H_{21})_2AlCl$ dicyclohexylaluminum chloride, di(3,5-diethylcyclohexyl)aluminum chloride, diphenylaluminum chloride, phenylaluminum dichloride, $(CH_3)_2AlBr$, $(C_2H_5)_2AlBr$, $(CH_3)(C_2H_5)AlBr$, $(CH_3)AlBr_2$, $(C_2H_5)AlBr_2$ dicyclohexylaluminum bromide, dinaphthylaluminum bromide, $(C_2H_5)_2AlF$, $(CH_3)(C_2H_5)AlF$, phenylaluminum difluoride, dicyclopentylaluminum fluoride, di(2-ethyl-4-isopropylcyclopentyl)aluminum fluoride,

$(C_2H_5)_2AlI$, $(C_3H_7)(C_4H_9)AlI$ diphenylaluminum iodide, $(CH_3)AlI_2$, $(C_2H_5)AlI_2$, and the like. Mixtures of two or more of these organometal halide components, for example a mixture of diethylaluminum chloride and dimethylaluminum chloride, or a mixture of diethylaluminum chloride and ethylaluminum dichloride can be used in the catalyst composition of the present invention.

The presently preferred organometal halides for use in the catalyst system of the invention are the dialkylaluminum chlorides wherein the alkyl radicals can be either similar or different, each containing from 1 to 8 carbon atoms. Specific examples of presently preferred organometal halides include diethylaluminum chloride, dimethylaluminum chloride, methylethylaluminum chloride, ethylpropylaluminum chloride, diisobutylaluminum chloride, di-n-octylaluminum chloride, and the like.

The vanadium compounds which are useful as a catalyst component in the production of high density polyolefins in accordance with the invention are the trialkyl vanadates having the generic formula $VO(OR')_3$, wherein the R''s can be similar or different, each R' being an alkyl, cycloalkyl, alkylcycloalkyl or cycloalkylalkyl radical containing from 1 to 20 carbon atoms. Specific examples of suitable trialkyl vanadates include trimethyl vanadate, triethyl vanadate, tri-n-butyl vanadate, methyldiethyl vanadate, dimethylethyl vanadate, tri-n-propyl vanadate, triisoamyl vanadate, tri-n-hexyl vanadate, tri(2,2-dimethylhexyl) vanadate, tri(2,3-dimethylbutyl) vanadate, triisooctyl vanadate, tri-n-decyl vanadate, tri(3-ethyloctadecyl) vanadate, tri-n-tetradecyl vanadate, tricyclopentyl vanadate, tri(2,4-dihexylcyclopentyl) vanadate, tricyclohexyl vanadate, tri(3-hexyl-5-octylcyclohexyl) vanadate, tri(2-cyclohexylethyl) vanadate, and the like. Mixtures of two or more of these vanadium compounds can be utilized in the catalyst of the invention. The presently preferred vanadium compounds are compounds having the formula $VO(OR')_3$, wherein R' is an acyclic alkyl radical having from 1 to 8 carbon atoms, the R''s being either similar or different.

Suitable solvents for use in the polymerization reaction of this process are paraffins, cycloparaffins and/or aromatic hydrocarbons, which are relatively inert, non-deleterious and liquid under the conditions of the process.

While the process is preferably carried out in the presence of the diluent, it can be conducted without the use of a diluent. Examples of diluents which can be used include butane, pentane, isooctane, cyclohexane, methylcyclohexane, and the like. Benzene, toluene, and the like can also be employed. It is also within the scope of the invention to utilize mixtures of two or more of the aforementioned diluents.

The ratio of the amount of organoaluminum halide to that of the trialkyl vanadate is generally in the range of about 0.1 to 1 to about 20 to 1 on a mol basis, preferably in the range of about 0.5 to 1 to about 5 to 1. The amount of the catalyst utilized is in the range of about 0.5 to about 2.5 weight percent of the monomer, preferably between about 0.65 and 1 percent.

The polymerization reaction can be conducted at temperatures within the range of about $-50$ to about 150° C., preferably from about $-20$ to about 100° C. The pressure can be maintained from a partial vacuum to about 1000 p.s.i.g., preferably in the range of about atmospheric to about 500 p.s.i.g.

The hydrogen can be added at the beginning of the polymerization reaction, at some stage during the polymerization, incrementally during the polymerization or continuously during the polymerization. The amount of hydrogen added is at least about 0.001 mol percent of the monomer and is usually from about 0.01 to about 10 mol percent of the monomer, preferably from about 0.05 to about 1 mol percent of the monomer.

The process of this invention can be carried out as a batch process by pressuring the ethylene into a reactor containing the catalyst and a diluent. Furthermore, the process can be carried out continuously by maintaining the above-described concentrations of reactants in the reactor for a suitable residence time. The residence time used in a continuous process can vary widely since it depends to a great extent upon the temperature at which the process is carried out. However, the residence time for the polymerization of ethylene generally falls within the range of one second to an hour or more. In the batch process, the time for the reaction can also vary widely, such as up to 24 hours or more.

In one particular system the catalyst mixture can be preformed in the presence of a suitable solvent and sufficient ethylene to just form particles. This material can be pumped into the reactor. The injection of ethylene can be utilized for temperature control during the formation of the polymer product. In an alternative system the catalyst components can be introduced separately into the reactor to form the catalyst mixture in situ.

At the completion of the polymerization reaction, any excess ethylene is vented, and the contents of the reactor, including the solid polymer swollen with diluent, are then treated to inactivate the catalyst and remove the catalyst residues. The inactivation of the catalys can be accomplished by washing with an alcohol, water or other suitable material. In some instances the catalyst inactivating treatment also removes a major portion of the catalyst residues while in other cases it may be necessary to treat the polymer with an acid, base or other suitable material in order to effect the desired removal of catalyst residues. The treatment of the polymer can be carried out in a comminution zone, such as a Waring Blendor, so that a finely divided polymer is thereby provided. The polymer is then separated from the diluent and treating agents, e.g., by decantation or filtration after which the polymer is dried. The diluent and alcohol can be separated by any suitable means, e.g., by fractional distillation, and reused in the process.

The polymer of ethylene which is produced in accordance with the invention can have a density in the range of 0.97 to 0.99, depending upon the particular catalyst and conditions utilized. These polymers are suitable for the production of molded and extruded articles and for the manufacture of film and fiber. It is within the contemplation of the invention for the monomer to contain minor amounts, for example, less than 10 weight percent of mono-1-olefins other than ethylene, for example 1-butene, propylene, 1-hexene and 1-octene. In general such aliphatic 1-olefins preferably contain from 2 to 8 carbon atoms.

The invention is further illustrated by the following examples but is not to be limited unduly thereby.

EXAMPLE I

A high-density, high-modulus polyethylene is made using a catalyst consisting of trialkyl vanadate and an organoaluminum halide in the presence of hydrogen.

| Run Number | 1 | 2 | 3 |
|---|---|---|---|
| Vanadium Compound, millimols | Tri-n-butyl vanadate | | |
| | 2 | 1 | 1 |
| Aluminum Compound, millimols | Diethylaluminum chloride | | |
| | 10 | 5 | 5 |
| Hydrogen | No | Yes | Yes |
| Relative Productivity | 1.0 | 2.28 | 3.38 |
| Density, g./ml.[a] | 0.9463 | 0.9744 | 0.9746 |
| Flexural Modulus, p.s.i. $\times 10^{-3}$ [b] | 144 | 294 | 345 |

[a] ASTM D 1505–60T.
[b] ASTM D 790–61.

EXAMPLE II

The procedure of Example I was repeated with $VOCl_3$ utilized instead of tri-n-butyl vanadate with the following results:

| Run Number | 4 | 5 |
|---|---|---|
| Vanadium Compound, millimols | $VOCl_3$ | |
| | 1 | 1 |
| Aluminum Compound, millimols | Diethylaluminum Chloride | |
| | 5 | 5 |
| Hydrogen | No | Yes |
| Relative Productivity | 1.0 | 0.456 |
| Density, g./ml.[a] | 0.9347 | 0.9692 |
| Flexural Modulus, p.s.i. $\times 10^{-3}$ [b] | 124 | 269 |

[a] ASTM D 1505–60T.
[b] ASTM D 790–61.

Thus it is readily seen that the utilization of the catalyst of the invention for the polymerization of ethylene in the presence of hydrogen resulted in a polymer having a density greater than 0.97 and an increased flexural modulus without incurring the decrease in relative productivity encountered by other catalyst systems. In fact the relative productivity with the catalyst of the invention was increased in the presence of hydrogen. Use of the vanadium compound $VOCl_3$, which is outside the scope of the invention, resulted in a considerable decrease in productivity in the presence of hydrogen and the density of the resulting polymer was not high as that produced with the tri-n-butyl vanadate.

Reasonable variation and modification are possible within the scope of the foregoing disclosure and the appended claims to the invention.

I claim:

1. A method for producing a high density polyethylene having a density of at least 0.97 which comprises contacting ethylene in the presence of hydrogen and under polymerization conditions with a catalytic amount of a catalyst which forms on admixing components comprising (1) an organometal compound having the formula $R_nAlX_{3-n}$, wherein each R is selected from the group consisting of saturated acyclic hydrocarbon radicals, saturated cyclic hydrocarbon radicals, and aromatic radicals, each R containing from 1 to 10 carbon atoms, X is a halogen, and $n$ is an integer selected from the group consisting of 1 and 2, and (2) a vanadium compound having the formula $VO(OR')_3$, wherein each R' is selected from the group consisting of alkyl, cycloalkyl, alkylcycloalkyl, and cycloalkylalkyl radicals containing from 1 to 20 carbon atoms, and recovering from the resulting polymerization reaction effluent a polyethylene having a density of at least 0.97 and in a yield greater than would be obtained by conducting said step of contacting in the absence of said hydrogen.

2. A method in accordance with claim 1 wherein the R's in said organometal compound are acyclic alkyl radicals having from 1 to 8 carbon atoms.

3. A method in accordance with claim 2 wherein the R"'s in said vanadium compound are acyclic alkyl radicals having from 1 to 8 carbon atoms.

4. A method in accordance with claim 3 wherein said polymerization conditions comprise a temperature in the range of about −50 to about 150° C. and a pressure in the range of subatmospheric to about 1000 p.s.i.g.

5. A method in accordance with claim 4 wherein the ratio of the organometal compound to the vanadium compound is in the range of 0.1 to 1 to about 20 to 1 on a mol basis, and the amount of the catalyst is in the range of about 0.5 to about 2.5 weight percent of the ethylene.

6. A method in accordance with claim 1 wherein the X in said organometal compound is chlorine.

7. A method in accordance with claim 6 wherein said organometal compound is diethylaluminum chloride and said vanadium compound is tri-n-butyl vanadate.

8. A method of producing a high density polymer of ethylene having a density of at least 0.97 which comprises contacting ethylene in the presence of hydrogen and under polymerization conditions with a catalytic amount of a catalyst which forms on admixing components consisting essentially of diethylaluminum chloride and tri-n-butyl vanadate, and recovering the polymer of ethylene having a density of at least 0.97 so produced in a yield greater than would be obtained by conducting said step of contacting in the absence of said hydrogen.

References Cited by the Examiner
UNITED STATES PATENTS 3,051,690  8/1962  Vandenberg _____ 260—94.9

OTHER REFERENCES

Derwent Belgian Pat. Report, vol. 69B, November 1960, Abstract No. 588 611, p. C22.

JOSEPH L. SCHOFER, *Primary Examiner.*

JAMES A. SEIDLECK, F. L. DENSON,
*Assistant Examiners.*